United States Patent [19]
Goldberg et al.

[11] Patent Number: 5,086,505
[45] Date of Patent: Feb. 4, 1992

[54] SELECTIVE INDIVIDUAL RESET APPARATUS AND METHOD

[75] Inventors: Steven J. Goldberg, Coral Springs; Gary S. Lobel, Boynton Beach, both of Fla.

[73] Assignee: Motorola, Inc., Schaumburg, Ill.

[21] Appl. No.: 374,011

[22] Filed: Jun. 30, 1989

[51] Int. Cl.⁵ .................................. G06F 13/00
[52] U.S. Cl. .................. 395/775; 364/DIG. 2; 364/942.1
[58] Field of Search ... 364/200 MS File, 900 MS File; 370/66, 101; 379/276

[56] References Cited

U.S. PATENT DOCUMENTS

| | | |
|---|---|---|
| 3,707,140 | 12/1972 | Gueldenpfennig et al. .... 379/276 X |
| 3,751,595 | 8/1973 | Moses ................................. 370/30 |
| 3,807,531 | 4/1974 | Mandel ............................... 187/121 |
| 3,815,104 | 6/1974 | Goldman ............................ 364/200 |
| 3,920,914 | 11/1975 | Brightman et al. ................ 370/66 |
| 4,156,112 | 5/1979 | Moreland ........................... 370/101 |

Primary Examiner—Thomas M. Heckler
Attorney, Agent, or Firm—Thomas G. Berry; Vincent B. Ingrassia

[57] ABSTRACT

An electronic system having a plurality of resettable modules, such as memories and input/output circuits, wherein the modules are selectively, individually resettable by providing each module with a specific time slot during which it can receive a reset signal and be reset. The reset signal either is not supplied to other modules outside of their individual time slots, in the case of a multiplexed bus, or has no effect until a time slot signal is applied in coincidence therewith.

10 Claims, 2 Drawing Sheets

SELECTIVE INDIVIDUAL RESET APPARATUS AND METHOD

The present invention refers to methods and apparatus for selectively resetting individual ones of a plurality of circuits in an electronic system and more specifically to methods and apparatus for selectively resetting individual ones of a plurality of circuits that are interconnected by means of a single shared bus.

BACKGROUND OF THE INVENTION

Electronic systems, such as multicard computer structures, individually or in other structures such as communications systems, usually consist of a set of cards sharing a common bus structure, often referred to as a "backplane". Depending upon the nature of the system, various types of reset structures are employed. The basic form provides one or more cards with circuitry which can generate a reset signal that will cause all cards on the backplane to enter a reset state. This type of reset is undesireable because all processes must stop, and begin again at the reset point. A great amount of time and information can be lost.

More sophisticated systems allow the selective resetting of individual cards. This allows a card which is not operating properly to be retrieved from some undesireable state that does not respond to normal communication attempts to restore its operation. All other cards should continue to operate without being effected. Selective resetting in the prior art requires each card to be assigned a unique address. A card is then reset by generating the assigned address on the backplane bus, along with a reset signal of some type. This type of selective reset is undesireable in a number of respects:

1. It requires a portion of the address space to be allocated for the reset purpose.
2. It assumes that the backplane is available for the reset operation.
3. It requires circuitry on each card to decode this unique address and may, in some circumstances, add drive requirements to the bus masters for circuitry which has no other benefit.

SUMMARY OF THE INVENTION

It is an object of the present invention to provide new and improved methods and apparatus for selectively resetting individual modules or cards in a multimodule electronic system. It is a further object of the present invention to provide selective resetting methods and apparatus that require the addition of a minimum number of components and utilize minimum time and energy.

These and other objects are realized in a novel method wherein each circuit of a plurality of resettable circuits interconnected by a single bus is assigned a specific and unique time slot in a time frame in which all time slots are combined to make up a frame, controlling each of the resettable circuits so that each circuit can only be reset during its unique time slot, and resetting a selected one of the circuits by supplying a reset pulse to the bus during the unique time slot of the selected circuit.

These and other objects are further realized in novel selective reset apparatus utilized in conjunction with an electronic system including a plurality of resettable circuits coupled together by means of a bus, said selective reset apparatus including timing means coupled to each of the plurality of resettable circuits by means of said bus for providing each of the plurality of resettable circuits a time slot during which a reset signal can be supplied thereto, reset enable circuitry associated with each of the plurality of resettable circuits and coupled to said timing means for being activated only during the time slot provided therefore, and reset signal generating means coupled to the bus for generating a reset signal, having a duration no longer than a time slot, during any selected time slot.

BRIEF DESCRIPTION OF THE DRAWINGS

Referring to the drawings.

DESCRIPTION OF THE PREFERRED EMBODIMENTS

Figure 1:
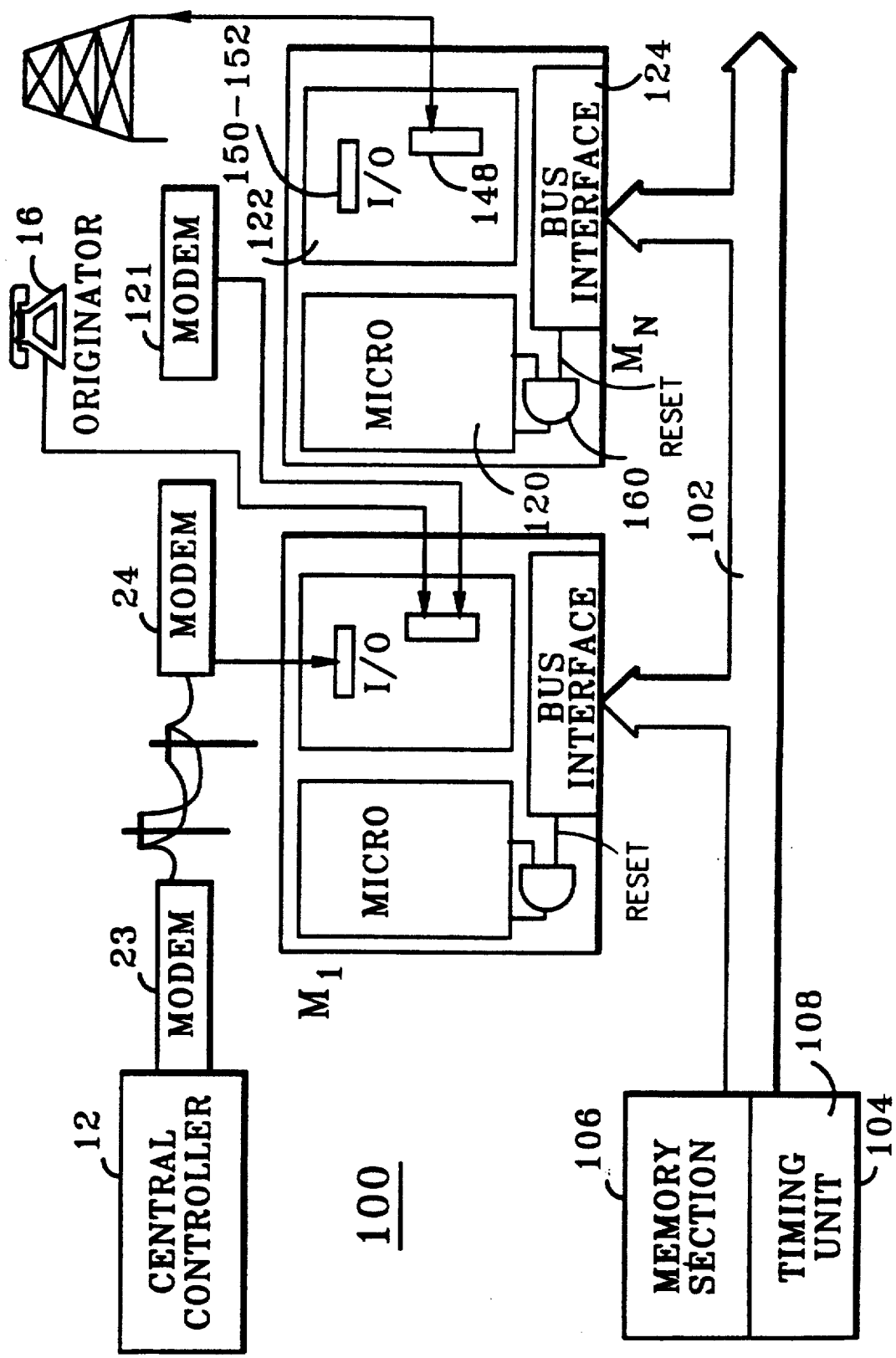
FIG. 1 is a functional block diagram of an electronic system including a multiplexed bus arrangement embodying the present invention.

The present invention operates in conjunction with electronic systems having a plurality of resettable circuits interconnected by a bus and is especially useful in systems utilizing a multiplexed bus arrangement, such as the paging controller 100 illustrated in FIG. 1 and described in more detail in copending U.S. patent application entitled "Paging Controller Having A Multiplex Bus Arrangement," Ser. No. 225,423, and filed on July 28 1988. Paging controller 100 includes a multiplexed bus arrangement having a common communication bus 102 interconnecting a plurality of modules, $M_1$, $M_2$, ... $M_{N-1}$, $M_N$, connected thereto. The communication bus 102 is further connected to a shared resource management unit 104, which includes a shared memory means 106 and a system wide timing unit 108. The communication bus exchanges voice, data and control information among the modules. It should be noted that in some paging systems of the type shown only one module and a shared resource management unit may be utilized.

In FIG. 1, module $M_N$ is a typical module in paging controller 100 and includes an I/O management section 122 having a plurality of input ports 150–152 and at least one telephone port 148. Telephone port 148 can be used either for input or output. If operating as an input port, telephone port 148 is connected to a telephone network, accepting incoming page requests. When telephone port 148 of a first board is operating as an output port, input ports 150–152 on another board can receive control, voice, and data information to be used for processing paging information to be transmitted to a selected paging receiver. The input ports include a serial port 150 and a telephone port 148. Telephone port 148 provides communications with a telephone company line or modem, depending upon the particular type of data to be received. Serial port 150 provides communications with a CRT console, central controller, disk, etc. and parallel port 152 serves as a microprocessor control port for on board hardware. When telephone port 148 is operating in the output mode, it is typically connected to a transmitter 22 to transmit paging information to one of a plurality of paging receivers.

Each module is provided with active processing capability by interfacing a microprocessor unit 120 having a corresponding memory and a bus system. The operation of microprocessor 120 effects one or more input/output actions in accordance with a predetermined process control program stored in microprocessor 120.

In addition to microprocessor unit 120 and I/O management section 122, a bus interface 124 is provided to communicate with bus 102.

In the general operation of the multiplexed bus system, each module, such as module M$_N$ takes turns in having access and control over communication bus 102. When a module has supervisory control over communication bus 102 it is referred to as a master of communication bus 102. Associated with each module is an address, with the addresses being numbered in sequence to define a succession order, and each module takes turns in being master of communication bus 102 in accordance with its sequence in the succession order. When a module is master of communication bus 102, it may exchange data with shared resource management unit 104. When the module is not a master, it is not permitted access or control over communication bus 102. However, it should be noted that in this specific system, when a module is not a master, the module may continue to receive information through its respective input ports and to output information through its respective output ports.

Shared resource unit 104 includes a memory device 106 for storing information received from a module and a system wide timing unit 108 to generate synchronization signals to notify the modules when they may access communication bus 102. Access by a module (master) is accomplished by sensing the synchronization signals and then determining the time period that the master has access to the bus, depending upon the predetermined address which has been asigned to the module. Additionally, system timing unit 108 generates the necessary signals for effecting a transfer of information on communication bus 102 in a manner well known in the art.

The access of the system wide memory by individual modules is performed on a time division multiplex basis. Each module is assigned a specific time slot of a frame to access communication bus 102. A frame is generaly equivalent to at least the total time of all the time slots. The total number of time slots is equivalent to the number of modules that can be connected to communication bus 102. In the present embodiment, each module becomes master of communication bus 102 during its time slot and even if there are less modules than time slots, each module only accesses communication bus 102 during its time slot. That is, if vacant time slots are available, these time slots are not used by any of the modules present in the system. This allows additional modules to be connected to communication bus 102 without interfering with the operation of modules already connected.

When timing unit 108 supplies the address to module MN which makes it master of communications bus 102, a signal is also supplied to one input of a two input AND gate 160 to the second input can pass therethrough. The output of AND gate 160 is supplied to microprocessor 120 to reset module MN. In this embodiment the reset signal is illustrated as coming from microprocessor 120, but it will of course be understood that the reset signal originates in any unit of the system and will appear on bus 102 and be supplied simultaneously to all modules. Also, while a very simple AND gate is illustrated as the apparatus for passing a reset signal only while module MN is master, it will be understood that many more sophisticated and failsafe circuits might be devised. However, AND gate 160 is illustrated for its simplicity and ease of integration.

While the circuit described above provides selective resetting of individual cards or modules, it is still convenient to provide a universal reset that will reset all modules, including shared resource unit 104 and any other modules without a time slot. The universal reset will permit system reset even when slot timing is inoperative. If this feature is provided separate from the selective reset described above, a separate line on the backplane and additional circuitry in the modules is required. Backplane signal lines are, however, often at a premium, and reducing the number is thus very desireable. To differentiate between the reset types the single signal line may be manipulated in several unique ways. Three methods are: (1) voltage level sensitivity, (2) baseband binary signalling, and (3) pulse width. While other variations are possible, the pulse width method is the simplest and most reliable.

Figure 2:
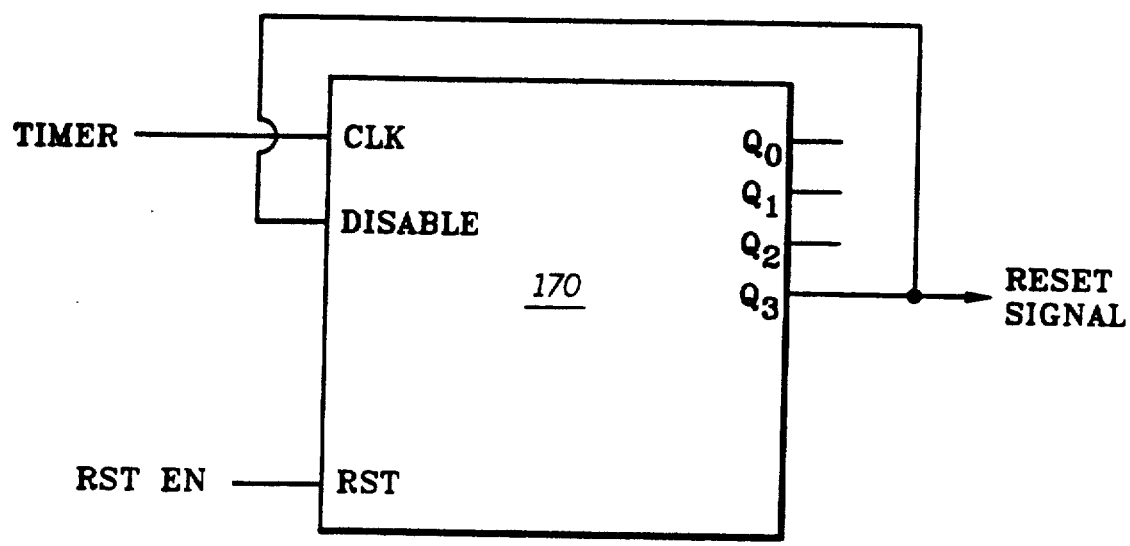
FIG. 2 illustrates a timer in block form for use as a universal reset in the electronic system of FIG. 1.

Referring specifically to FIG. 2, a counter 170 suitable for use as a universal reset is illustrated in block form. Counter 170 has a clock input with a 921600 KHz clock (not shown) attached thereto. Counter 170 also receives an active derivation of the backplane reset signal laballed RST EN herein. The Q3 output of counter 170 is supplied as an input signal to the disable input thereof and is also supplied to the local on-card reset circuitry. When an active reset signal is supplied from communication bus 102 to the reset input, counter 170 is allowed to operate. If the reset signal is active for less than 7.6 microseconds counter 170 will not reach the Q3 high state, and no local reset signal will be generated. If the reset signal is active for more than 8.7 microseconds, Q3 will supply a high signal to the disable input, which will disable further operation and cause a reset signal to be maintained on the card. Also, timing unit 108 and any other modules without an assigned time slot may include a similar timer, or the like so that the universal reset signal will cause each such module to generate a reset signal within the module while a shorter reset signal will not cause a reset. Thus, a universal reset signal, in this embodiment a reset signal longer than 8.7 microseconds, resets all modules in the system. Since an individual reset signal is shorter than 8.7 microseconds, generally about 2 microseconds, there is no danger of an individual reset inadvertently causing a universal reset. Upon complete reset, the reset signal on communication bus 102 is inactivated and counter 170 returns to the inactive or reset state.

Thus, new and improved selective resetting methods and apparatus have been disclosed which allow the selective resetting of individual resettable modules or circuits in an electronic system. The methods and apparatus utilize a minimum of additional components and are simple and inexpensive to install and use. Further, because of the novel construction and operation of the disclosed resetting structure, a universal reset can be incorporated therein with a minimum of additional components.

While I have shown and described specific embodiments of the present invention, further modifications and improvements will occur to those skilled in the art. I desire it to be understood, therefore, that this invention is not limited to the particular forms shown and I intend in the appended claims to cover all modifications which do not depart from the spirit and scope of this invention.

What is claimed is:

1. In an electronic system including a plurality of resettable circuits, a method of providing selective resetting of individual ones of the resettable circuits, comprising the steps of:

assigning each of the plurality of resettable circuits a time slot in a time frame, the time frame being at least equivalent to the total of all the time slots;

controlling each of the plurality of resettable circuits so that each of the plurality of resettable circuits can be reset only during the time slot assigned thereto;

providing a reset signal during the time slot of a predetermined one of the plurality of resettable circuits to be reset; and supplying the provided reset signal to the predetermined one of the plurality of resettable circuits.

2. A method as claimed in claim 1 wherein the step of supplying the provided reset signal includes the step of simultaneously supplying the provided reset signal to all of the resettable circuits.

3. A method as claimed in claim 1 including in addition the step of resetting all of the plurality of resettable circuits by generating a reset pulse which exceeds a predetermined length.

4. A method as claimed in claim 3 wherein the reset pulse which exceeds a predetermined length is generated by providing a timing circuit which generates a pulse of the required length when a pulse of a shorter, predetermined length, which is longer than a single time slot, is supplied thereto.

5. In an electronic system including a plurality of resettable circuits, selective individual reset circuitry comprising:

timing means for providing each of the plurality of resettable circuits a time slot during which a reset pulse can be supplied thereto;

a reset enable circuit associated with each of the plurality of resettable circuits and coupled to said timing means for being activated by said timing means only during the time slot provided therefore; and reset signal generating means coupled to the reset enable circuit associated with each of the plurality of resettable circuits for generating a reset signal, having a duration no longer than a single time slot, during any specific predetermined time slot.

6. Reset circuitry as claimed in claim 5 wherein the plurality of resettable circuits are interconnected by a bus and the timing means and reset signal generating means are coupled to each of the plurality of resettable circuits by the bus.

7. Reset circuitry as claimed in claim 5 wherein the reset enable circuit includes an AND gate coupled to receive a signal the length of a time slot from the timing means and a reset signal from the reset signal generating means.

8. Reset circuitry as claimed in claim 5 wherein the electronic system includes a general timing clock coupled to all of the plurality of resettable circuits for timing the operations thereof and the timing means and reset signal generating means are connected to the clock for timing thereof.

9. Reset circuitry as claimed in claim 5 including in addition a general reset circuit coupled to each of the plurality of resettable circuits and designed to generate a reset signal exceeding a predetermined length.

10. In a multiplex bus arrangement for providing voice, data, and control information to be communicated among a plurality of resettable modules operatively connected to the bus, selective individual module reset circuitry comprising:

timing means coupled to each of the plurality of resettable modules through the multiplex bus for providing each of said plurality of resettable modules a time slot during which each module can use the multiplex bus and a reset pulse can be supplied thereto;

reset enable circuitry included in each of the plurality of resettable modules and coupled to said timing means through the multiplex bus for being activated only during the time slot provided therefore; and reset signal generating means coupled to the reset enable circuitry included in each of the plurality of resettable modules through the multiplex bus for generating a reset signal, having a duration no longer than a single time slot, during any specific, predetermined time slot.

* * * * *